Dec. 25, 1923.  1,478,460
C. L. STIBITZ ET AL
CONVEYER CHAIN
Filed March 14, 1922
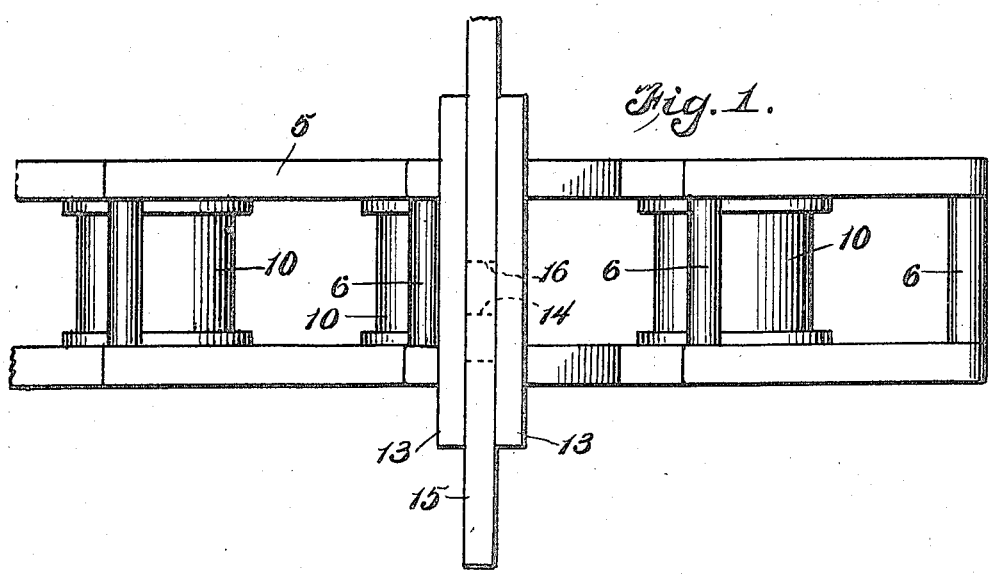
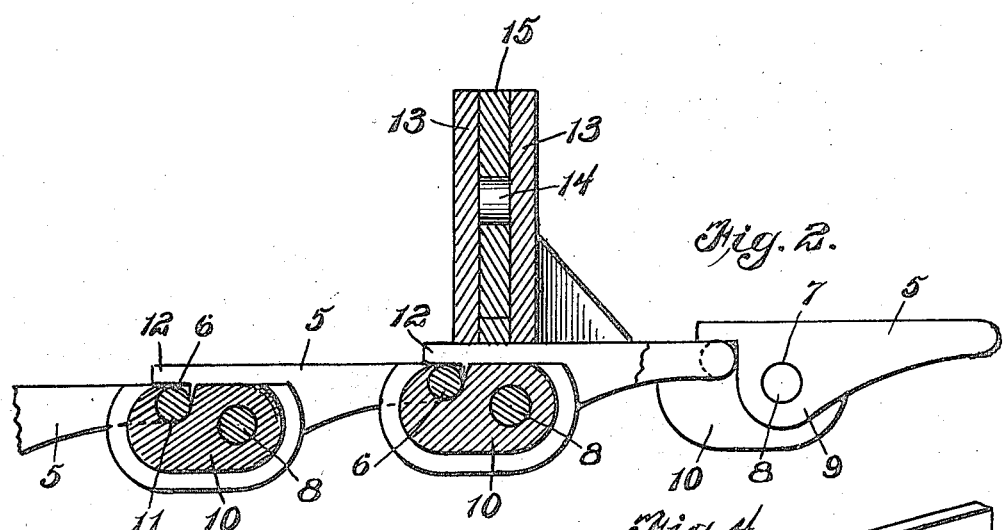
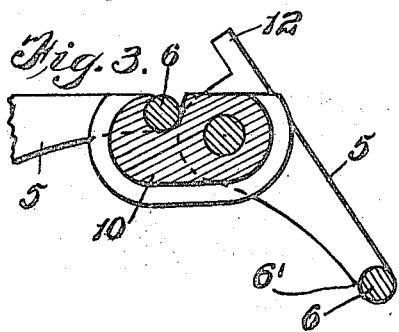
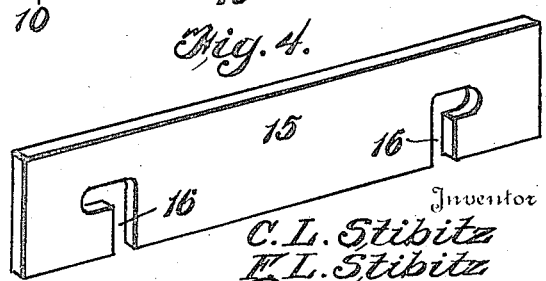
Inventor
C. L. Stibitz
F. L. Stibitz
By
Attorney Patented Dec. 25, 1923.

1,478,460

UNITED STATES PATENT OFFICE.

CHARLES L. STIBITZ AND FRANK L. STIBITZ, OF WILBURTON, PENNSYLVANIA.

CONVEYER CHAIN.

Application filed March 14, 1922. Serial No. 543,761.

*To all whom it may concern:*

Be it known that we, CHARLES L. STIBITZ and FRANK L. STIBITZ, both citizens of the United States, residing at Wilburton, in the county of Columbia and State of Pennsylvania, have invented new and useful Improvements in Conveyer Chains, of which the following is a specification.

This invention relates to chains for conveyer flights, the primary object being to provide a chain having links of such structure as to enable the same to be readily detached from one another when required, and which are so constructed and assembled with each other as to render it practically impossible for the links to become accidentally disconnected when the chain is in use.

A further object of the invention is to provide a chain of such character that the links are automatically locked together and tend to remain so when the chain is in use, and which can not be detached or uncoupled casually unless breakage of one or more of the links occurs.

A further and particular object of the invention is to provide a chain of the character stated wherein the several links are of uniform construction so as to enable the same to be interchangeably used.

Further objects reside in providing a conveyer flight chain of the character and for the purposes mentioned which shall be of simple construction and inexpensive manufacture, which involve the use of comparatively few parts, which has its several parts so constructed and arranged as to enable the same to be easily connected or disconnected by those ordinarily unskilled in such matters, and which obviates the use of bolts, rivets or other securing elements in the assemblage of the chain.

With these and other objects in view, the invention consists of the features of construction, combination and arrangement of parts, hereinafter fully described and claimed, reference being had to the accompanying drawing, in which:—

Figure 1 is a plan view of a portion of a conveyer flight having chains constructed in accordance with the invention.

Figure 2 is a side elevation, parts in section, of the chain as shown in Figure 1, Figure 3 is a detail view showing the manner in which adjacent chain links are positioned relative to each other when it is desired to disconnect the same, and Figure 4 is a perspective view of a flight plate used in carrying out the invention.

The chains forming the conveyer flight will be arranged in pairs, those of the pairs being disposed parallel to each other and spaced proper distances apart so as to travel over the carrying sprockets. Only a portion of one chain is shown in the present illustration.

The chain is constructed of the required number of links, the several links being of identical construction, so far as their coupling is concerned, so that the said links may be readily detached and are all interchangeable. Each link includes a pair of spaced parallel side plates indicated at 5, permanently connected together at one end by a cylindrical bar 6, and each of the plates near its opposite end is provided with an opening 7 to receive a connecting pin 8. The openings 7 are arranged in an offset portion 9 on the side plates, and these openings are alined with each other, the construction being such that the pin 8 will be parallel with the connecting member 6 yet out of the plane of the latter.

The pin 8 rotatably supports a coupling block indicated at 10, and this block fits snugly between the side plates 5 of the link. The upper surface of the coupling block 10, near its free end, is provided with a transversely disposed recess or notch 11 to receive and snugly and rotatably maintain the bar 6 of the next adjacent chain link.

The notch 11 is of a diameter conforming substantially to the diameter of the pin 8, but its entranceway or opening leading thereto is of a width less than the diameter of the pin and major diameter of the notch. The pin 6 cannot, therefore, be inserted or removed through said entranceway or opening, but is designed to be applied and removed by sliding motion of the pin 6 in one direction or the other via one end or the other of the notch, the ends of which notch open through the sides of the block 10. In order to permit this to be done, the ends (one or both) of the side plates 5 carrying the pin 6 are reduced, as at 6', to a width conforming to the diameter of the entranceway or opening of the notch 11, so as to permit movement of one or the other of said arms through said entranceway, when the links are disposed substantially at right angles to each other, so that the pin 6 may be slid into or out of the notch. The said plates 5 of each link are provided at their forward ends with shoulders or lugs 12 to overlie the ends of the pin 6 at the rear ends of the side plates 5 of the next adjacent chain link, whereby upward swinging movement to released position of the link member carrying the pin 6 seated in the particular notch 11 in question will be prevented, and hence disconnection of the link members prevented in normal service, such construction, however, permitting the link members to have a proper range of articulating motion on each other in the travel of the links around their supporting sprockets.

Figure 2 shows the links in the position which they may occupy at times when the chain is not drawn taut. When the chain is drawn taut, or the links are passing around their guide sprockets or pulleys, the swing of the links on their pivotal connections will cause the lugs 12 to move to a greater or less extent away from the pins 6 but not to a sufficient extent to permit the pins 6 to move out of the notches 11 even in the event that the contracted entranceways to said notches should be enlarged by wear to a width equal to or greater than the full diameter of the pins. Normally, however, as before described, the pins 6 cannot be displaced in this manner, but must be moved endwise of the notches, i. e., crosswise of the chain, in order to permit of their disconnection, so that contact of the lugs 12 with the pins 6, in order to hold such pins confined in the notches 11, is unnecessary. However, in the event that the contracted entranceways of the notches should be enlarged by wear the lugs 12 will, as set forth, prevent casual displacement of the pins 6 therefrom.

By so constructing the links, the tension or strain in the chain will be delivered equally to the bars 6, coupling block 10, pin 8 and side plates 5 of the links, and as the strain or pull in the chain is longitudinal thereof at all times, the tendency will be for the several links to have their parts disposed in locking position, that is, with the coupling block 10 extending from the same direction as the side plates 5, and the overhanging shoulders 12 similarly disposed so as to overlie the side plates of the next adjacent link, whereby the bar 6 of the latter link will be held firmly against detachment from the coupling block 10. The pivotal connection of the blocks with their respective links, and of the adjacent links with the several blocks, permits of a wide range of flexibility in the chain, in order that the same will readily conform to the sprockets over which it must pass.

Should, however, it be desired at any time to disconnect any link of the chain from another link, it is but necessary to swing one link member so as to raise the lugs or shoulders 12 out of the path of upward movement of the ends 6' of the side plates 5 of the next adjacent link, the pin 6 of which is seated in the notch 11 of the link in question provided with the lugs or shoulders 12, thereby allowing the second-named link to be swung upwardly to a position at right angles to the first-named link, without interference from the lugs or shoulders 12, and thus enabling the pin 6 of the second-named link to be shifted laterally out of the notch 11, in which operation, it will be understood, the reduced end 6' of the side plate 5 at the rear of the sliding link in its direction of movement travels through the entranceway or opening of the notch 11. Two links may be joined by disposing the coupling ends of the two link members in a similar manner at right angles to each other and sliding the pin 6 of one link into the notch 11 of the other link, from one side thereof, in which operation the reduced end 6' of the forward plate of the link carrying the pin 6, in the direction of sliding motion of said link, travels through the opening or entranceway of the notch 11, as will be readily understood.

Such of the links of the chain as are to act as supports for the cross members constituting the flights will each be equipped with transversely disposed parallel plates 13, either formed integral with or rigidly connected to their respective links. These plates may be of a width substantially equal to or slightly greater than the breadth of the chain links of which they form a part, and the plates are connected near one end with a pin 14 disposed a substantial distance above the lower ends of the plates. These pins constitute anchoring devices for the flight members shown in Figure 4 and indicated at 15. These flight members are provided with bayonet slots indicated at 16, the said slots adapted to accommodate the pins 14 of the opposed links. Preferably, the plates 15 are of a thickness substantially equal to the distance between the plates 13, so as to snugly fit and be accommodated therein, and it will be observed that the bayonet slots 16 in the flight members 15 are disposed in the directions opposite to each other, so that when the flight members are applied they will be readily held in place and will be prevented from becoming accidentally detached from the chain.

From the foregoing it is apparent that we have provided a conveyer flight including a chain of extremely simple construction and composed of but few readily assembled parts, and that by the use of a chain so constructed danger of the same becoming dismounted or the several links thereof becoming detached from each other in the operation of the chain will be negatived.

While the above is a description of the invention in its preferred embodiment, it will be understood that various changes in the minor details of construction and arrangement of parts may be resorted to if desired, without departing from the spirit of the invention as defined by the claims.

Having thus fully described our invention, we claim:

1. In a conveyer chain, a plurality of links each comprising side plates permanently connected together at one end by a cross bar, a pin connecting the other ends of the plates of each bar, and a coupling block carried by each pin and detachably connected to the cross bar of the next adjacent link.

2. In a conveyer chain, a chain comprising a plurality of links each comprising a pair of spaced parallel side plates connected together at one end by a bar, a pin connecting the opposite ends of each pair of links and disposed out of the plane of the said cross bar, a coupling block rotatably secured upon said pin, the said block having a notch to receive the cross bar of the next adjacent link, and shoulders on the side plates of each link to be disposed over the cross bar of the next adjacent link when seated in said recess.

3. In a conveyer chain, a link comprising spaced side plates, a cylindrical bar connecting said plates at one end, an offset near the adjacent end of each of said plates, a pin connecting said offset portions and disposed out of the plane of said bar, a coupling block swingingly mounted on said pin, one surface of said block having a recess therein, and shoulders on the adjacent ends of said side plates disposed over the plane of said recess.

4. In a conveyer chain, a link comprising spaced parallel side plates, upstanding plate members carried by said side plates and connecting the latter, the said plate members being spaced apart, and a locking pin connecting said plate members.

5. In a conveyer chain, a link, a pair of plates carried by said link and disposed transversely of the path of travel of the link, the said plates being arranged in spaced parallel relation, and a locking pin connecting said plates intermediate the ends thereof and spaced inwardly from the bottom and top of said plates.

6. In a conveyer chain, a link, a pair of plates disposed transversely of said link and in spaced parallel relation, a pin connecting said plates, a flight member of a thickness to fit snugly between said spaced plates and of equal depth with the latter, and a bayonet slot in said flight member adapted to receive the pin connecting said plates.

In testimony whereof we affix signatures.

CHARLES L. STIBITZ.
FRANK L. STIBITZ.